United States Patent
Kumar et al.

(10) Patent No.: US 11,625,811 B2
(45) Date of Patent: *Apr. 11, 2023

(54) ADAPTIVE NON-RIGID TARGETED DEFORMATION OF IMAGES FOR SYNTHETIC IMAGE GENERATION

(71) Applicant: Applied Materials, Inc., Santa Clara, CA (US)

(72) Inventors: Abhinav Kumar, San Jose, CA (US); Benjamin Schwarz, San Jose, CA (US); Charles Hardy, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/216,459

(22) Filed: Mar. 29, 2021

(65) Prior Publication Data
US 2021/0217135 A1 Jul. 15, 2021

Related U.S. Application Data

(63) Continuation of application No. 16/259,898, filed on Jan. 28, 2019, now Pat. No. 10,963,990.

(51) Int. Cl.
*G06T 3/40* (2006.01)
*G06N 3/08* (2023.01)
(Continued)

(52) U.S. Cl.
CPC ........ *G06T 3/4046* (2013.01); *G06K 9/00523* (2013.01); *G06N 3/08* (2013.01);
(Continued)

(58) Field of Classification Search
CPC .............. G06K 9/6206; G06K 9/6212; G06K 2009/363; G06K 9/6262; G06K 9/66; G06K 9/00523; G06T 7/149; G06T 2207/20081; G06T 2207/20084; G06T 3/4046; G06T 7/62; G06T 5/50; G06T 3/40; G06T 3/4069; G06N 20/00; G06N 3/08; G06N 3/084; G06N 3/0454; H04N 5/2628; G06V 10/44; G06V 10/764; G06V 10/82
(Continued)

(56) References Cited

U.S. PATENT DOCUMENTS

2005/0268256 A1 12/2005 Tsai et al.
2018/0268255 A1* 9/2018 Surazhsky ........... G06V 10/772
(Continued)

*Primary Examiner* — Huy C Ho
(74) *Attorney, Agent, or Firm* — Lowenstein Sandler LLP

(57) ABSTRACT

A method includes determining a plurality of features of a first original image of a first product that are expected to be different for one or more products to be produced via manufacturing parameters of a manufacturing process compared to the first product. The method further includes adjusting one or more of the plurality of features of the first original image to generate a first synthetic image. The method further includes providing a plurality of images including the first original image and the first synthetic image to train a machine learning model to generate a trained machine learning model configured to generate output associated with updating the manufacturing parameters of the manufacturing process.

20 Claims, 8 Drawing Sheets

(51) Int. Cl.
  *G06N 20/00*        (2019.01)
  *G06K 9/00*         (2022.01)
  *G06T 7/62*         (2017.01)
  *G06T 5/50*         (2006.01)

(52) U.S. Cl.
  CPC .............. *G06N 20/00* (2019.01); *G06T 5/50* (2013.01); *G06T 7/62* (2017.01); *G06T 2207/20081* (2013.01); *G06T 2207/20084* (2013.01)

(58) Field of Classification Search
  USPC ........................................................ 382/276
  See application file for complete search history.

(56) References Cited

U.S. PATENT DOCUMENTS

2019/0122029 A1* 4/2019 Shen .................... G06V 40/164
2020/0219248 A1   7/2020 Kaneko

* cited by examiner

ADAPTIVE NON-RIGID TARGETED DEFORMATION OF IMAGES FOR SYNTHETIC IMAGE GENERATION

RELATED APPLICATION

This application is a continuation application of U.S. patent application Ser. No. 16/259,898, filed Jan. 28, 2019, the entire contents of which are hereby incorporated by reference herein.

TECHNICAL FIELD

The present disclosure relates to image measurement, and, more particularly, automated image measurement, such as for semiconductor processing.

BACKGROUND

Large amounts of images (e.g., of wafers, etc.) are generated by different industries (e.g., semiconductor industry, biomedical industry, display industry, photovoltaic industry, etc.). For example, thousands of images may be generated every month in a semiconductor laboratory during process development. To perform image measurements, a setup (e.g., recipe setup) may be created for measuring attributes (e.g., product width, height, etc.) of a first image. The setup may be run on the remaining images to measure attributes of the remaining images. If the remaining images have variations (e.g., variation in structure of the product, variations due to change in process and imaging conditions, etc.), the setup created based on the first image may not apply and a system using the setup may fail to measure the attributes of the remaining images. Due to this failure, the remaining images may be manually measured by process engineers. The manual measurements may include errors, may be subject to variations from one engineer to another engineer, and may take up much engineer time.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving a plurality of original images including a first original image. Each original image of the plurality of original images is of a corresponding product associated with a manufacturing process. The method further includes performing, based on process information about the manufacturing process, feature extraction to identify a plurality of features of the first original image that are expected to change based on manufacturing parameters of the manufacturing process. The method further includes generating a first synthetic image of a plurality of synthetic images by performing targeted deformation of one or more of the plurality of features of the first original image. The targeted deformation adjusts one or more features of the plurality of features. The method further includes using the plurality of original images and the plurality of synthetic images to train a machine learning model to automatically determine an image processing algorithm to use for measuring one or more attributes of images of product associated with the manufacturing process.

In another aspect of the disclosure, a system includes a memory and a processing device coupled to the memory. The processing device is to receive a plurality of original images including a first original image. Each original image of the plurality of original images is of a corresponding product associated with a manufacturing process. The processing device is further to perform, based on process information about the manufacturing process, feature extraction to identify a plurality of features of the first original image that are expected to change based on manufacturing parameters of the manufacturing process. The processing device is further to generate a first synthetic image of a plurality of synthetic images by performing targeted deformation of one or more of the plurality of features of the first original image. The targeted deformation adjusts one or more features of the plurality of features. The processing device is further to use the plurality of original images and the plurality of synthetic images to train a machine learning model to automatically determine an image processing algorithm to use for measuring one or more attributes of images of product associated with the manufacturing process.

In another aspect of the disclosure, a non-transitory computer readable medium having instructions stored thereon, which, when executed by a processing device, cause the processing device to receive a plurality of original images including a first original image. Each original image of the plurality of original images is of a corresponding product associated with a manufacturing process. The processing device is further to perform, based on process information about the manufacturing process, feature extraction to identify a plurality of features of the first original image that are expected to change based on manufacturing parameters of the manufacturing process. The processing device is further to generate a first synthetic image of a plurality of synthetic images by performing targeted deformation of one or more of the plurality of features of the first original image. The targeted deformation adjusts one or more features of the plurality of features. The processing device is further to use the plurality of original images and the plurality of synthetic images to train a machine learning model to automatically determine an image processing algorithm to use for measuring one or more attributes of images of product associated with the manufacturing process.

BRIEF DESCRIPTION OF THE DRAWINGS

The present disclosure is illustrated by way of example, and not by way of limitation in the figures of the accompanying drawings.

DETAILED DESCRIPTION

Figure 1:
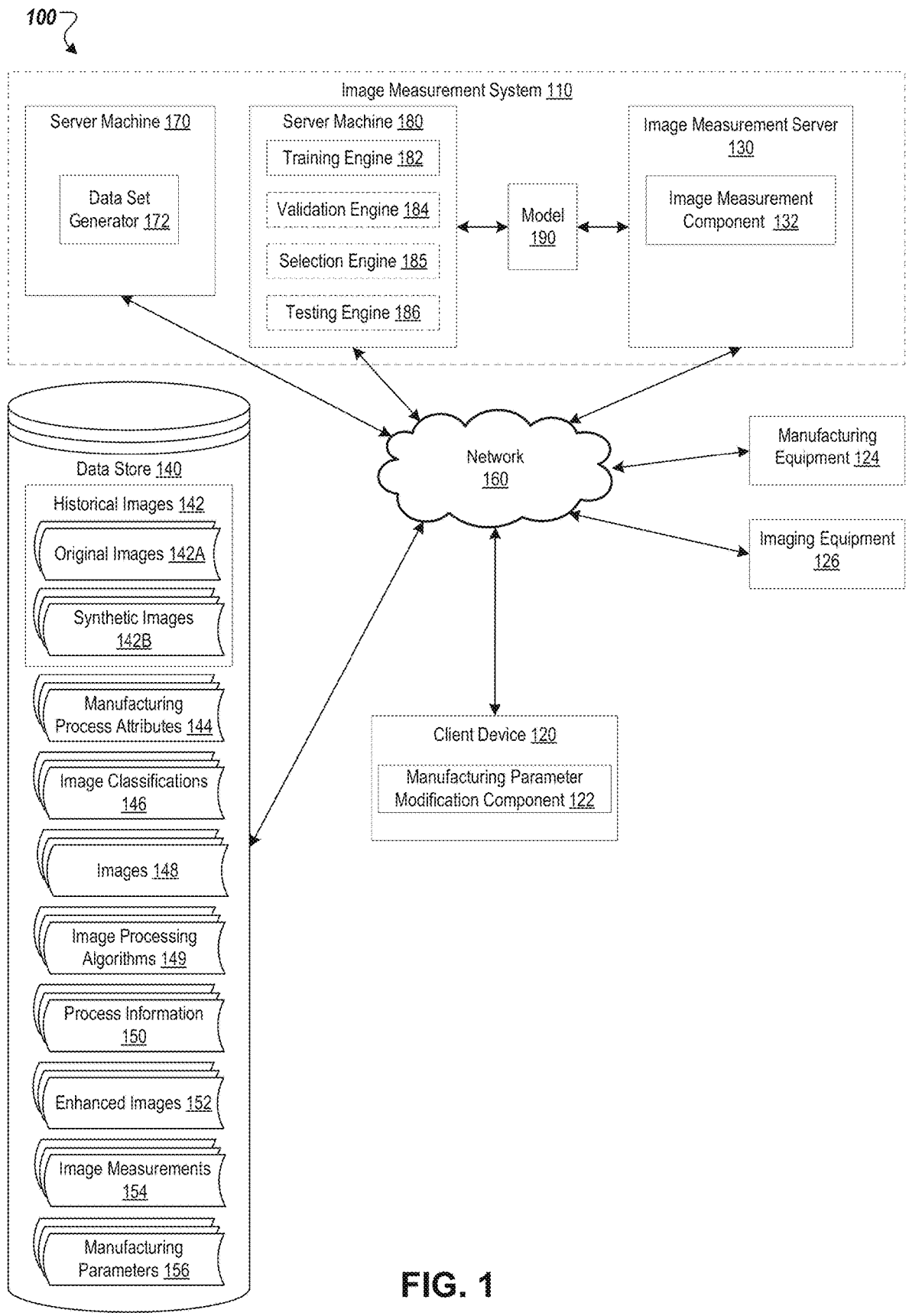
FIG. 1 is a block diagram illustrating an exemplary system architecture, according to certain embodiments.

Described herein are technologies directed to automated image measurement for faster process development and optimization (e.g., for faster semiconductor process development and optimization). In conventional systems, a user may create a setup (e.g., recipe setup) for measuring attributes (e.g., width, height, etc.) of a product based on a first image and run the setup on remaining images to measure attributes of the remaining images. If the remaining images have variations, the setup created on the first image may not apply and a system using the setup may fail to measure the attributes of the remaining images. Conventional systems may not be able to handle variations in structures in images responsive to changes in manufacturing processes and imaging conditions. For example, images may have one or more variations (e.g., due to different process or imaging conditions, etc.) including one or more of different contrasts, gradients, dark areas, colors, intensities, attributes with different dimensions (e.g., width, height, elongation), etc. A system that is to measure an attribute of an image by determining a distance from a first edge to a second edge may not be able to identify the first edge and second edge because of these variations. The system may either provide an erroneous measurement (e.g., distance between different portions of the image than the first edge and the second edge) or may fail to provide a measurement. Images with variations may be manually measured by process engineers. The manual measurements may include errors, may be subject to variations from one engineer to another engineer, and may take up much engineer time.

The devices, systems, and methods disclosed herein use automated image measurement for faster process development and optimization. A processing device may receive an image (of original images captured by an imaging system) of a product associated with a manufacturing process and determine, using a trained machine learning model, an image classification for the image. The processing device may select, based on the image classification, one or more image processing algorithms and process information for the image. The processing device may pre-process the image based on at least one of the one or more image processing algorithms and/or the process information to generate an enhanced image (e.g., the image may be enhanced to better identify the edges for performing measurements). The processing device may measure, using a first image processing algorithm (e.g., image measurement algorithm) of the one or more image processing algorithms, one or more attributes of the enhanced image to determine image measurements and may report the image measurements. The manufacturing parameters of the manufacturing process may be updated based on the image measurements.

In some embodiments, the processing device may determine that the original images are insufficient to train the machine learning model. The processing device may perform, based on process information about the manufacturing process, feature extraction to identify features of a first original image that are expected to change based on manufacturing parameters of the manufacturing process. The processing device may generate a first synthetic image (of synthetic images) by performing targeted deformation of one or more of the features of the first original image. The targeted deformation may adjust one or more features (e.g., generate synthetic images by deforming features in original features that are expected to change based on the manufacturing parameters). The original images and the synthetic images in combination may be sufficient to train the machine learning model. The processing device may use the original images and the synthetic images to train a machine learning model to automatically determine an image processing algorithm to use for measuring one or more attributes of images of product associated with the manufacturing process.

The devices, systems, and methods disclosed herein may be able to handle large variation in structures (e.g., using a priori information of process structure and image processing algorithms to handle variations) for semiconductor process flow optimization (e.g., due to changes in processing or imaging conditions) and may be applicable to multiple image modalities (e.g., scanning electron microscope (SEM), cross-sectional SEM (XSEM), transmission electron microscope (TEM), top-down imaging, cross-section imaging, etc.) in research and development laboratories, production facilities, biomedical applications, etc. The devices, systems, and methods disclosed herein may automatically measure different types of structures or images captured by different types of modality, without any user intervention, by identifying the type of structure present in the image automatically (e.g., image classification) and applying image processing (e.g., to generate measurement statistics and optimize manufacturing processes, such as in semiconductor research and development laboratories). The devices, systems, and methods disclosed herein may not rely on user creation of a setup (e.g., recipe setup) before starting measurement on similar looking images. The automated process of image measurement, as disclosed herein, may avoid manual measurement error, avoid engineer-engineer variation, and free up engineer time. The devices, systems, and methods disclosed herein may not rely on user assistance for setup.

Aspects of the present disclosure result in technological advantages of significant reduction in energy consumption (e.g., battery consumption), bandwidth, processor overhead, and so forth. In some embodiments, the technological advantages result from using automated image measurement to determine image measurements of images with variations (e.g., variations due to change in process and imaging conditions, etc.) which reduces errors, variations from engineer to engineer, and user time compared to manual image measurement. The reduced error and engineer-to-engineer variations may result in less used bandwidth, lower processor overhead, and lower energy consumption (e.g., that would have otherwise been used to correct the errors, etc.). The automated image measurement of the present disclosure may result in faster process development and optimization (e.g., for semiconductor manufacturing processes). For example, manufacturing parameters of manufacturing processes may be updated based on the automated image measurements (e.g., of images with and without variations). The updated manufacturing parameters may be determined via the automated image measurements of the present disclosure which results in using less energy, less bandwidth, less processor overhead, less errors, less engineer-to-engineer variations, etc. than performing manual measurements. The updates to the manufacturing parameters determined via the present disclosure can produce products faster and that are optimized (e.g., more likely within specification) than conventional approaches. In some embodiments, the technological advantages further result from synthetically generating images for training a machine learning model to automatically determine an image processing algorithm to use for automated image measurement (e.g., instead of not having enough images to train the machine learning model and resulting to performing manual measurements).

FIG. 1 is a block diagram illustrating an exemplary system architecture 100, according to certain embodiments. The system architecture 100 includes client device 120, manufacturing equipment 124, imaging equipment 126, an image measurement server 130, and a data store 140. The image measurement server 130 may be part of an image measurement system 110. Image measurement system 110 may further include server machines 170 and 180.

The imaging equipment 126 may include one or more of a scanning electron microscope (SEM), a cross-sectional SEM (XSEM), a transmission electron microscope (TEM), a top-down imaging device, a cross-section imaging device, etc. The imaging equipment 126 may provide images (e.g., historical images 142, images 148, etc.) of products (e.g., wafers, semiconductor devices, coatings, etched regions, implanted regions, etc.) associated with a manufacturing process (e.g., products processed by manufacturing equipment 124). The images may be stored in the data store 140. The images may be associated (e.g., labeled) with one or more of manufacturing process attributes 144 (e.g., job attributes, manufacturing tool or equipment, project, customer, program, type of manufacturing process), image classifications 146, manufacturing parameters 156, etc.

The client device 120, manufacturing equipment 124, imaging equipment 126, image measurement server 130, data store 140, server machine 170, and server machine 180 may be coupled to each other via a network 160 to determine image measurements 154 for determining updates to manufacturing parameters 156 of manufacturing processes. In some embodiments, network 160 is a public network that provides client device 120 with access to the image measurement server 130, data store 140, and other publically available computing devices. In some embodiments, network 160 is a private network that provides client device 120 with access to the image measurement server 130, data store 140, and other privately available computing devices. Network 160 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 120 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The client device 120 may be capable of receiving images (e.g., historical images 142, images 148) from imaging equipment 126, receiving image measurements 154 or updates to manufacturing parameters 156 from the image measurement system 110, etc. via the network 160. The client device 120 may determine manufacturing process attributes 144, image classifications 146, manufacturing parameters 156, etc. associated with images (e.g., by receiving data from one or more of the manufacturing equipment 124, imaging equipment, or data store 140). The client device 120 may be capable of transmitting images (e.g., historical images 142, images 148), manufacturing process attributes 144, image classifications 146, manufacturing parameters 156, etc. to the image measurement system 110, receiving updates to manufacturing parameters 156 from the image measurement system 110, transmitting the updates to the manufacturing parameters 156 to the manufacturing equipment 124, etc. via the network 160. In some embodiments, client device 120 may modify manufacturing parameters (e.g., process parameters, hardware parameters, etc.) of the manufacturing equipment 124 based on the image measurements 154 or updates to the manufacturing parameters 156. Each client device 120 may include an operating system that allows users to one or more of generate, view, or edit data (e.g., image measurements 154, manufacturing parameters 156, etc.).

The client device 120 may include a manufacturing parameter modification component 122. Manufacturing parameter modification component 122 may receive user input (e.g., via a graphical user interface displayed via the client device 120) associated with images for automated image measurement. For example, the user input may indicate one or more of images, manufacturing process attributes 144, image classifications 146, manufacturing parameters 156, a manufacturing process, manufacturing equipment 124, etc. In some embodiments, the client device 120 transmits the user input (e.g., images, manufacturing process attributes 144, etc.) to the image measurement server 130 and the client device 120 receives image measurements 154 from the image measurement server 130. The client device 120 may determine updates to the manufacturing parameters 156 of a manufacturing process and may cause the manufacturing parameters 156 of the manufacturing equipment 124 to be updated accordingly (e.g., transmit the updates to the manufacturing parameters 156 to the manufacturing equipment 124, implement the updates to the manufacturing parameters 156, etc.). In some embodiments, the image measurement server 130 determines the updates to the manufacturing parameters 156. In some embodiments, the image measurement server 130 or the client device 120 determine updates to the imaging parameters of the imaging equipment 126 and cause imaging parameters of the imaging equipment 126 to be updated (e.g., transmit the updates to the imaging parameters to the imaging equipment 126, implement the updates to the imaging parameters, etc.).

The image measurement server 130 may include one or more computing devices such as a rackmount server, a router computer, a server computer, a personal computer, a mainframe computer, a laptop computer, a tablet computer, a desktop computer, graphics processing unit (GPU), accelerator application-specific integrated circuit (ASIC) (e.g., tensor processing unit (TPU)), etc. The image measurement server 130 may include an image measurement component 132. In some embodiments, the image measurement component 132 may use images 148 and manufacturing process attributes 144 to determine image measurements 154. The results of the image measurements 154 may be used for updating manufacturing parameters 156 of a manufacturing process being developed). In some embodiments, the image measurement server 130 may use a trained machine learning model 190 to determine an image classification 146 for identifying a corresponding image processing algorithm 149 and corresponding process information 150 to generate an enhanced image 152 to be processed for determining image measurements 154.

The image measurement component 132 may receive (e.g., retrieve from the data store 140) an image 148 of a product (e.g., wafer) associated with a manufacturing process and manufacturing process attributes 144 associated with the manufacturing process. The image measurement component 132 may determine, using a trained machine learning model 190, an image classification 146 for the image (e.g. based on the image 148 and the manufacturing process attributes 144). The image measurement component 132 may select, based on the image classification 146, an image processing algorithm 149 and process information 150 for the image 148. The image measurement component 132 may pre-process the image 148 based on at least one of the image processing algorithm 149 or the process information 150 to generate an enhanced image 152. The image measurement component 132 may measure, using the image processing algorithm 149, one or more attributes (e.g., width of portions of the product, height of portions of the product, etc.) of the enhanced image 152 to determine image measurements 154 and may report the image measurements 154 (e.g., to the client device 120). The manufacturing parameters 156 of the manufacturing process (e.g., of the manufacturing equipment 124 on which the manufacturing process was performed) may be updated based on the image measurements 154.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store one or more of historical images 142, manufacturing process attributes 144, image classifications 146, images 148, image processing algorithms, process information 150, enhanced images 152, image measurements 154, manufacturing parameters 156, etc. The historical images 142 may include original images 142A over a period of time or for a plurality of runs of the manufacturing equipment 124. The historical images 142 may include synthetic images 142B created based on the original images 142A. Each historical image 142 may correspond to a respective instance of manufacturing process attributes 144 (e.g., the instance of manufacturing parameters 156 used by the manufacturing equipment 124 to produce products corresponding to the historical image 142), image classification 146, etc.

In some embodiments, manufacturing parameters 156 include one or more of settings (e.g., process parameters) or components (e.g., size, type, hardware parameters, etc.) of the manufacturing equipment 124. Manufacturing parameters 156 may include one or more of temperature (e.g., heater temperature), spacing (SP), pressure, high frequency radio frequency (HFRF), voltage of electrostatic chuck (ESC), current, a first precursor, a first dilutant, a second dilutant, a first reactant, a second reactant, a second precursor, gas flow rate for one or more gases, etc.

In some embodiments, the client device 120 may store one or more of historical images 142 (e.g., images used or to be used for training of a machine learning model), manufacturing process attributes 144, image classifications 146, or images 148 (e.g., images input or to be input into a trained machine learning model to determine image classifications 146) in the data store 140 and the image measurement server 130 may retrieve one or more of historical images 142, manufacturing process attributes 144, image classifications 146, or images 148 from the data store 140. In some embodiments, the image measurement server 130 may store one or more of image measurements 154 or manufacturing parameters 156 in the data store 140 and the client device 120 may retrieve one or more of image measurements 154 or manufacturing parameters 156 from the data store 140.

In some embodiments, image measurement system 110 further includes server machine 170 and server machine 180. The server machines 170 and 180 may be one or more computing devices (such as a rackmount server, a router computer, a server computer, a personal computer, a mainframe computer, a laptop computer, a tablet computer, a desktop computer, etc.), GPUs, ASICs (e.g., TPUs), data stores (e.g., hard disks, memories databases), networks, software components, or hardware components.

Server machine 170 includes a data set generator 172 that is capable of generating data sets (e.g., a set of data inputs and a set of target outputs) to train, validate, or test a machine learning model 190. Some operations of data set generator 172 are described in detail below with respect to FIGS. 2 and 6. In some embodiments, the data set generator 172 may partition the historical images 142 (e.g., and corresponding manufacturing process attributes 144) and image classifications 146 into a training set (e.g., sixty percent of the historical images 142), a validating set (e.g., twenty percent of the historical images 142), and a testing set (e.g., twenty percent of the historical images 142).

Server machine 180 includes a training engine 182. Server machine 180 may also include a validation engine 184, a selection engine, and a testing engine 186. An engine (e.g., a training engine 182, a validation engine 184, a selection engine, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a machine learning model 190 using the training set from data set generator 172. The training engine 182 may generate multiple trained machine learning models 190, where each trained machine learning model 190 corresponds to a distinct set of features (e.g., images 142 and a first portion of the manufacturing process attributes 144, images 142 and a second portion of the manufacturing process attributes 144, etc.) of the training set. For example, a first trained machine learning model may have been trained using all features (e.g., features X1-X5 and all manufacturing process attributes 144), a second trained machine learning model may have been trained using a first subset of the features (e.g., X1, X2, X4, and a first portion of manufacturing process attributes 144), and a third trained machine learning model may have been trained using a second subset of the features (e.g., X1, X3, X4, and X5, and a second portion of the manufacturing process attributes 144) that may partially overlap the first subset of features.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). The data inputs may include images and/or processing parameters. The data outputs may include manufacturing information, an identification of image enhancement processes to perform on images and/or an identification of an image measurement algorithm to perform on the images. Patterns in the data sets can be found that map the data input to the target output (the correct answer), and the machine learning model 190 is provided mappings that captures these patterns. The machine learning model 190 may be a convolutional neural network (CNN). The CNN may be able to receive images as training, validation, or testing input. The trained CNN may be able to receive images as input (e.g., for determining image classification).

Image measurement component 132 may provide an image 148 and corresponding manufacturing process attributes 144 as input to the trained machine learning model 190 and may run the trained machine learning model 190 on the input to obtain one or more outputs. Image measurement component 132 may be capable of extracting an image classification 146 from the output of the trained machine learning model 190 and may extract confidence data from the output that indicates a level of confidence that the image 148 corresponds to the image classification 146. The image measurement component 132 may use the confidence data to decide whether to use the image classification 146 to identify a corresponding image processing algorithm 149 and process information 150 for generating an enhanced image 152 and determining image measurements 154.

The confidence data may include or indicate a level of confidence of an image classification 146 corresponding to the image 148. In one example, the level of confidence is a real number between 0 and 1 inclusive, where 0 indicates no confidence of an image classification 146 corresponding to the image 148 and 1 indicates absolute confidence of an image classification 146 corresponding to the image 148.

For purpose of illustration, rather than limitation, aspects of the disclosure describe the training of a machine learning model using historical images 142, manufacturing process attributes 144, and image classifications 146 and inputting images 148 into the trained machine learning model to determine image classifications 146. The image classifications may be associated with process information, image processing algorithms, image enhancement processes, and/or image measurement algorithms. Once an image classification 146 is determined, the associated process information, at least one of the image processing algorithms, and/or image enhancement processes may be used to enhance the image, and the associated image measurement algorithm (e.g., of the image processing algorithms) and/or process information may be used to automatically perform a measurement on the enhanced image. A result of the image measurement may be used for updating of manufacturing parameters 156. In other implementations, a heuristic model or rule-based model is used to determine image classifications 146 for updating of manufacturing parameters 156 (e.g., without using a trained machine learning model). Image measurement component 132 may monitor historical images 142. Any of the information described with respect to data inputs 210 of FIG. 2 may be monitored or otherwise used in the heuristic or rule-based model.

In some embodiments, the functions of client device 120, image measurement server 130, server machine 170, and server machine 180 may be provided by a fewer number of machines. For example, in some embodiments server machines 170 and 180 may be integrated into a single machine, while in some other embodiments, server machine 170, server machine 180, and image measurement server 130 may be integrated into a single machine.

In general, functions described in one embodiment as being performed by client device 120, image measurement server 130, server machine 170, and server machine 180 can also be performed by image measurement server 130 in other embodiments, if appropriate. In addition, the functionality attributed to a particular component can be performed by different or multiple components operating together. For example, in some embodiments, the image measurement server 130 may transmit the updates to manufacturing parameters 156 to the manufacturing equipment 124. In another example, client device 120 may determine the image classifications 146 based on output from the trained machine learning model 190.

In addition, the functions of a particular component can be performed by different or multiple components operating together. One or more of the image measurement server 130, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of determining image measurements to update manufacturing parameters 156 of manufacturing equipment 124 in manufacturing facilities (e.g., semiconductor manufacturing facilities, biomedical facilities), embodiments may also be generally applied to determining measurements (e.g., of attributes with variations). Embodiments may be generally applied to optimizing process development.

Figure 2:
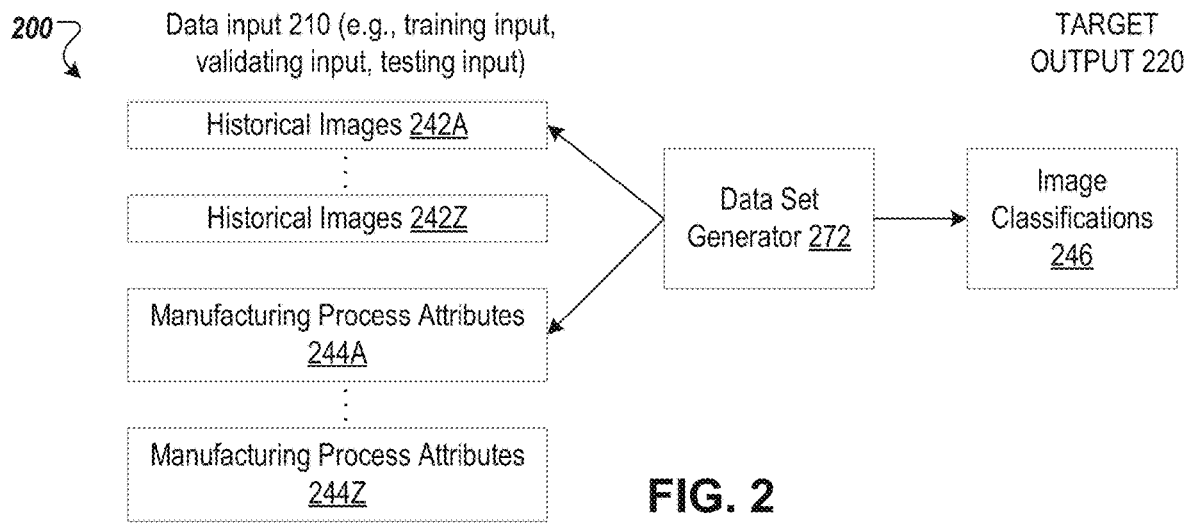
FIG. 2 is an example data set generator to create data sets for a machine learning model, according to certain embodiments.

FIG. 2 is an example data set generator 272 (e.g., data set generator 172 of FIG. 1) to create data sets for a machine learning model (e.g., model 190 of FIG. 1) using historical images 242 (e.g., historical images 142 of FIG. 1), according to certain embodiments. System 200 of FIG. 2 shows data set generator 272, data inputs 210, and target output 220.

In some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set may also include mapping data that maps the data inputs 210 to the target outputs 220. Data inputs 210 may also be referred to as "features," "attributes," or "information." In some embodiments, data set generator 272 may provide the data set to the training engine 182, validating engine 184, or testing engine 186, where the data set is used to train, validate, or test the machine learning model 190. Some embodiments of generating a training set may further be described with respect to FIG. 6.

In some embodiments, data inputs 210 may include one or more of historical images 242 (e.g., historical images 142 of FIG. 1), manufacturing process attributes 244 (e.g., manufacturing process attributes 144 of FIG. 1), etc. Each instance of manufacturing process attributes 244 may include one or more process parameters, hardware parameters, etc. Target output 220 may include image classifications 246 (e.g., image classifications 146 of FIG. 1). The image classifications may include or be associated with process information, one or more image processing algorithms, image enhancement processes and/or image measurement algorithms.

In some embodiments, data set generator 272 may generate a first data input corresponding to a first set of features (e.g., one or more first manufacturing process attributes 244) to train, validate, or test a first machine learning model and the data set generator 272 may generate a second data input corresponding to a second set of features (e.g., one or more second manufacturing process attributes 244) to train, validate, or test a second machine learning model.

In some embodiments, the data set generator 272 may discretize one or more of the data input 210 or the target output 220 (e.g., to use in classification algorithms for regression problems). Discretization of the data input 210 or target output 220 may transform continuous values of variables into discrete values. In some embodiments, the discrete values for the data input 210 indicate discrete manufacturing process attributes 244.

Data inputs 210 and target outputs 220 to train, validate, or test a machine learning model may include information for a particular facility (e.g., for a particular semiconductor manufacturing facility). For example, the historical images 242, manufacturing process attributes 244, and image classifications 246 may be for the same manufacturing facility as the images 148.

In some embodiments, the information used to train the machine learning model may be from specific types of manufacturing equipment 124 of the manufacturing facility having specific characteristics. The trained machine learning model may determine outcomes for a specific group of manufacturing equipment 124 based on data input 210 associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing machine learning model 190 using the data set, the machine learning model 190 may be further trained, validated, tested (e.g., using manually determined image classifications, etc.), or adjusted (e.g., adjusting weights associated with input data of the machine learning model 190, such as connection weights in a neural network).

Figure 3:
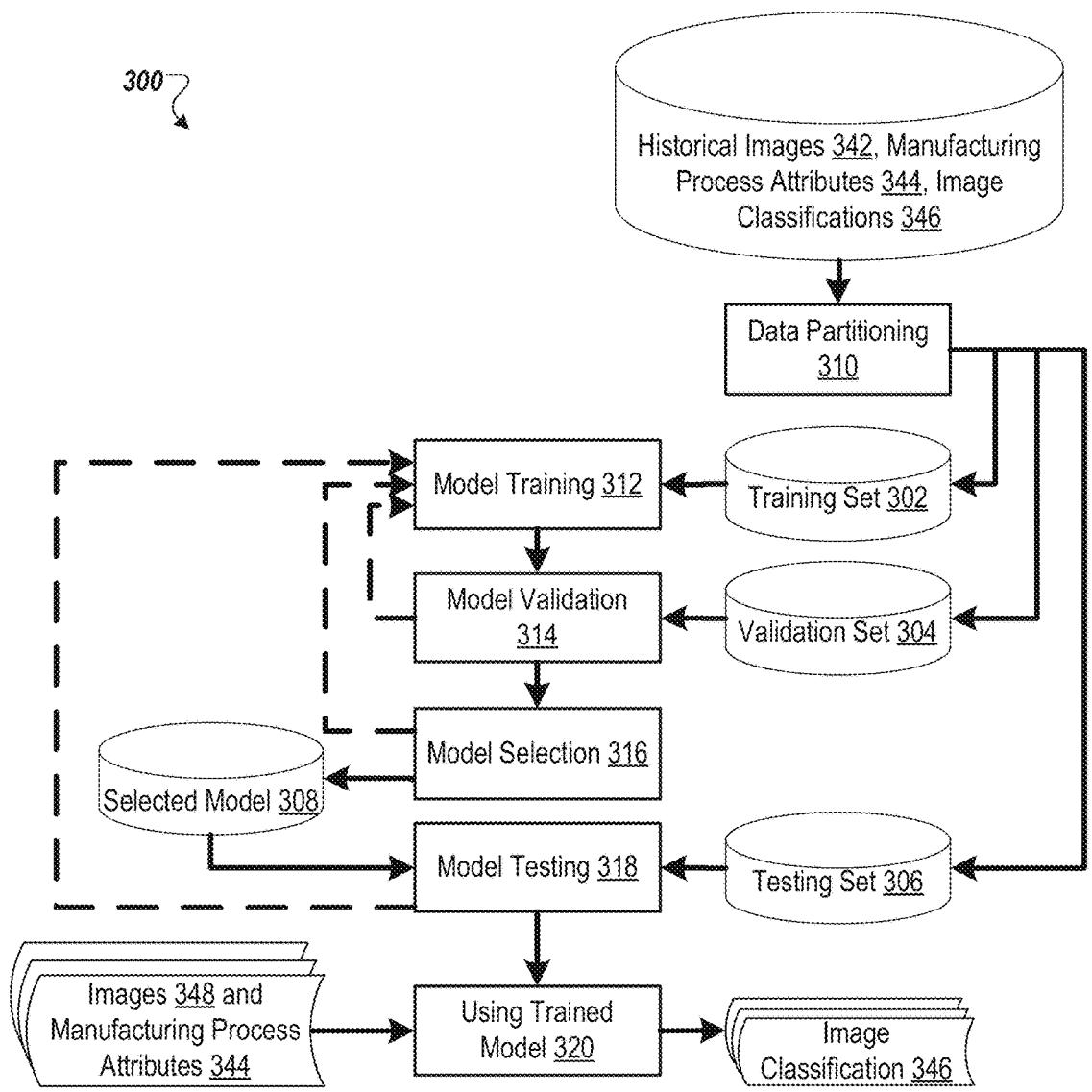
FIG. 3 is a block diagram illustrating a system for determining image classification, according to certain embodiments.

FIG. 3 is a block diagram illustrating a system 300 for determining image classifications 346 (e.g., image classifications 146 of FIG. 1), according to certain embodiments.

At block 310, the system 300 (e.g., image measurement system 110 of FIG. 1) performs data partitioning (e.g., via data set generator 172 of server machine 170 of FIG. 1) of the historical images 342 (e.g., historical images 142 of FIG. 1) to generate the training set 302, validation set 304, and testing set 306. For example, the training set may be 60% of the historical images 342, the validation set may be 20% of the historical images 342, and the validation set may be 20% of the historical images 342. The system 300 may generate a plurality of sets of features for each of the training set, the validation set, and the testing set. For example, if the manufacturing process attributes 344 has 20 manufacturing process attributes (e.g., process parameters, hardware parameters, etc.) and 100 runs for each manufacturing process attribute, a first set of features may be manufacturing process attributes 1-10, a second set of features may be manufacturing process attributes 11-20, the training set may be runs 1-60, the validation set may be runs 61-80, and the testing set may be runs 81-100. In this example, the first set of features of the training set would be manufacturing process attributes 1-10 of runs 1-60.

At block 312, the system 300 performs model training (e.g., via training engine 182 of FIG. 1) using the training set 302. The system 300 may train multiple models using multiple sets of features of the training set 302 (e.g., a first set of features of the training set 302, a second set of features of the training set 302, etc.). For example, system 300 may train a machine learning model to generate a first trained machine learning model using the first set of features in the training set (e.g., manufacturing process attributes 1-10 of runs 1-60) and to generate a second trained machine learning model using the second set of features in the training set (e.g., manufacturing process attributes 11-20 of runs 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being manufacturing process attributes 1-15 and second set of features being manufacturing process attributes 5-20). In some embodiments, hundreds of models may be generated including models with various permutations of features and combinations of models.

At block 314, the system 300 performs model validation (e.g., via validation engine 184 of FIG. 1) using the validation set 304. The system 300 may validate each of the trained models using a corresponding set of features of the validation set 304. For example, system 300 may validate the first trained machine learning model using the first set of features in the validation set (e.g., manufacturing process attributes 1-10 of runs 61-80) and the second trained machine learning model using the second set of features in the validation set (e.g., manufacturing process attributes 11-20 of runs 61-80). In some embodiments, the system 300 may validate hundreds of models (e.g., models with various permutations of features, combinations of models, etc.) generated at block 312. At block 314, the system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 performs model selection (e.g., via selection engine 315) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 may test, using the first set of features in the testing set (e.g., manufacturing process attributes 1-10 of runs 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and not applicable to other data sets such as the testing set 306), flow continues to block 312 where the system 300 performs model training (e.g., retraining) using different training sets corresponding to different sets of features (e.g., different manufacturing process attributes). Responsive to determining that the selected model 308 has an accuracy that meets a threshold accuracy based on the testing set 306, flow continues to block 320. In at least block 312, the model may learn patterns in the historical images 342 to make predictions and in block 318, the system 300 may apply the model on the remaining data (e.g., testing set 306) to test the predictions.

At block 320, system 300 uses the trained model (e.g., selected model 308) to receive images 348 and corresponding manufacturing process attributes 344 (e.g., images 148 and corresponding manufacturing process attributes 144 of FIG. 1) and extracts, from the output of the trained model, a corresponding image classification 346 (e.g., image classification 346 of FIG. 1).

In some embodiments, responsive to manually determining image classification of an image, flow may continue to block 312 (e.g., via a feedback loop) where the manually determined image classification, image 348, and manufacturing process attributes 344 may be used to update the trained model via model training (e.g., model retraining).

In some embodiments, responsive to receiving additional data (e.g., additional historical images, corresponding manufacturing process attributes, and corresponding image classifications), flow may continue to block 310 to re-train the trained machine learning model based on the additional data and the original data (e.g., historical images 342, manufacturing process attributes 344, and image classifications 346 previously used to train the machine learning model).

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

Figure 4:
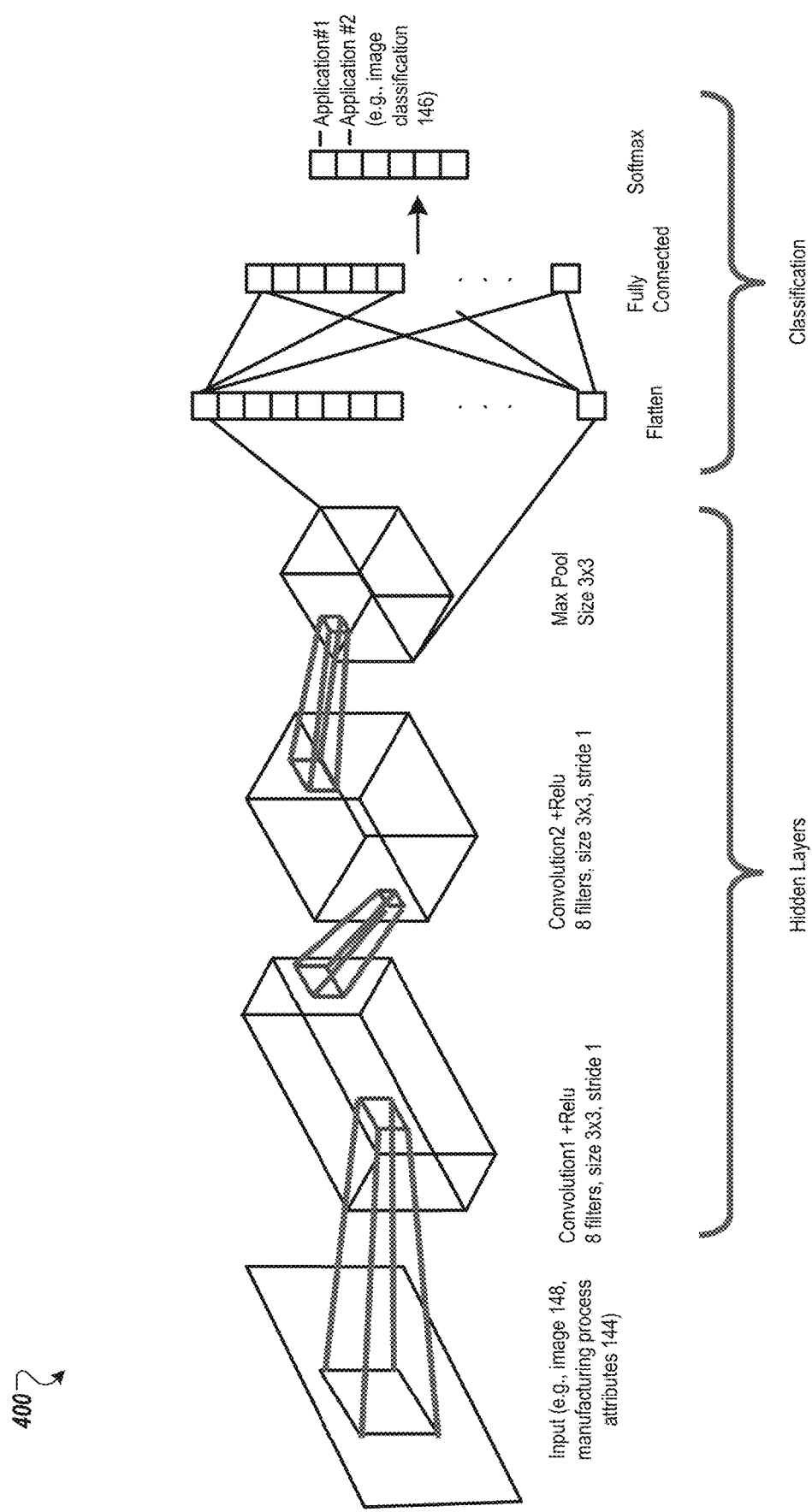
FIG. 4 is a block diagram illustrating a system for determining image classification, according to certain embodiments.

FIG. 4 is a block diagram illustrating a system 400 (e.g., using model 190 of FIG. 1) to determine image classification (e.g., image classification 146 of FIG. 1), according to certain embodiments. The system 400 may use a trained machine learning model (e.g., model 190 of FIG. 1) to determine image classification. The image classification is associated with one or more image processing algorithms that are used to enhance and measure the image for updating manufacturing parameters. In some embodiments, the model is a CNN model. In some embodiments, the model is a CNN model trained a priori from scratch. In some embodiments, the model is a CNN model trained using feature identification from a pre-trained open source CNN network. The hyperparameters of the model may be changed for further optimization (e.g., via retraining).

The system 400 may receive input including an image (e.g., image 148 of FIG. 1). The input may also include manufacturing process attributes (e.g., manufacturing process attributes 144 of FIG. 1). The system 400 may have hidden layers and may perform classification. In the hidden layers, the system 400 may perform a first convolution and rectified linear unit (relu) (e.g., including 8 filters, size 3×3, and stride 1), then a second convolution and relu (e.g., 8 filters, size 3×3, stride 1), and then determine a maximum pool (e.g., size 3×3). After determining the max pool, the system 400 may perform flattening, may perform connecting, and may determine the image classification (e.g., image classification 146) (e.g., via a softmax function, via a final layer of a neural network-based classifier, etc.). In some embodiments, the hyperparameters (e.g., filters, size, stride, number of convolutions, etc.) of the machine learning model may be changed for further optimization.

Figure 5:
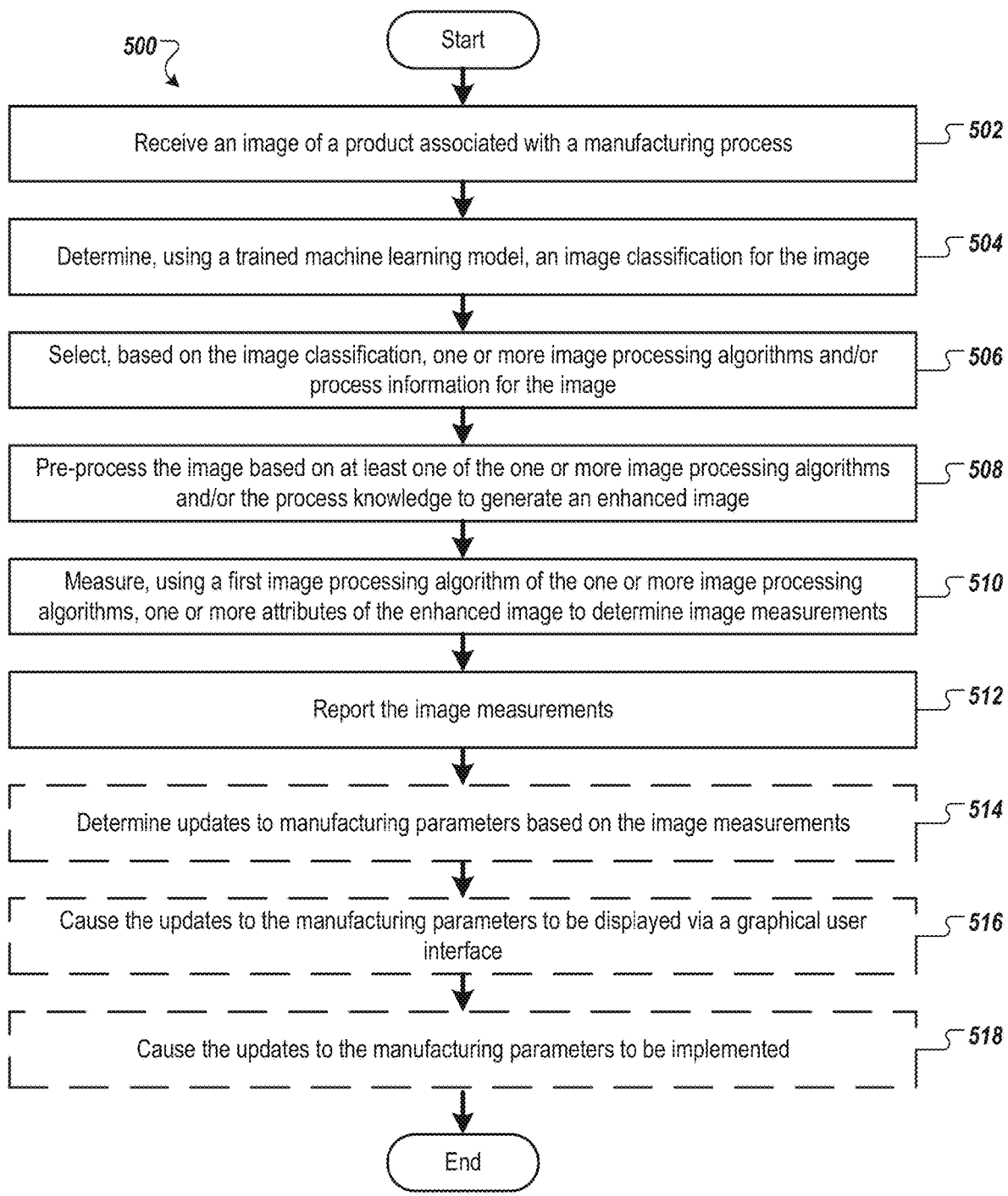
FIG. 5 is a flow diagram illustrating an example method of determining image measurements, according to certain embodiments.
Figure 6:
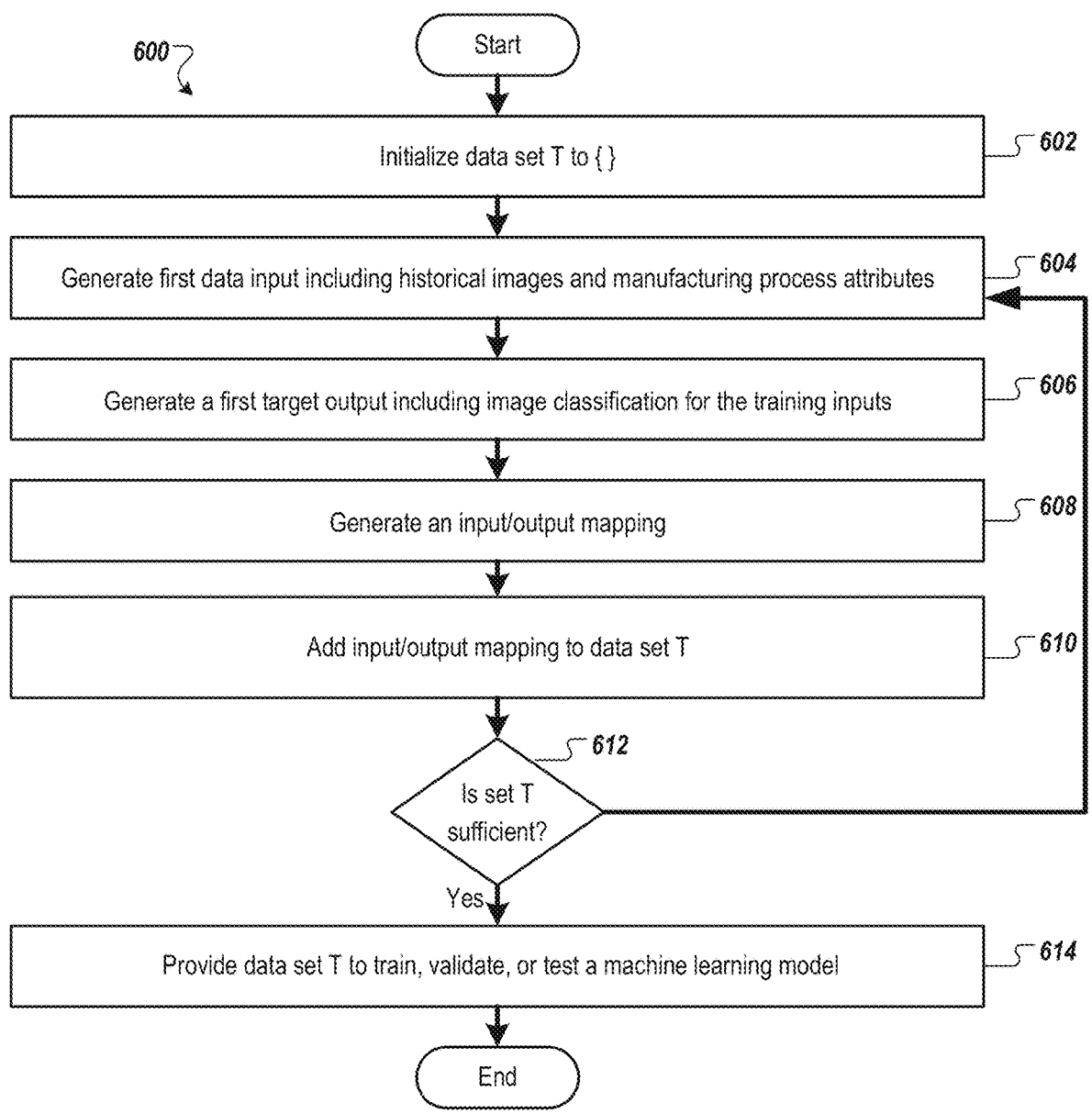
FIG. 6 is a flow diagram illustrating an example method of generating data sets for determining image classification, according to certain embodiments.

FIGS. 5-6 are flow diagrams illustrating example methods 500-600 associated with determining image classifications (e.g., image classification 146 of FIG. 1) of images (e.g., images 148 of FIG. 1), according to certain embodiments. Methods 500-600 may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In one embodiment, methods 500-600 may be performed, in part, by image measurement system 110. In some embodiments, methods 500-600 may be performed by image measurement server 130. In some embodiments, a non-transitory storage medium stores instructions that when executed by a processing device (e.g., of image measurement system 110), cause the processing device to perform methods 500-600.

For simplicity of explanation, methods 500-600 are depicted and described as a series of acts. However, acts in accordance with this disclosure can occur in various orders and/or concurrently and with other acts not presented and described herein. Furthermore, not all illustrated acts may be performed to implement the methods 500-600 in accordance with the disclosed subject matter. In addition, those skilled in the art will understand and appreciate that the methods 500-600 could alternatively be represented as a series of interrelated states via a state diagram or events.

FIG. 5 is a flow diagram of a method 500 for determining image measurements (e.g., image measurements 154 of FIG. 1) and automatically measuring images using the determined image measurements. The result of the image measurements may be used to determine, for example, critical dimensions of a semiconductor structure. The result of the image measurements may be used for updating manufacturing parameters (e.g., manufacturing parameters 156 of FIG. 1), according to certain embodiments. The processing logic (e.g., via method 500) may enable complete automation for image measurement so that no user intervention and recipe creation is performed.

Referring to FIG. 5, at block 502 the processing logic receives an image (e.g., image 148 captured by imaging equipment 126 of FIG. 1) of a product associated with a manufacturing process (e.g., of manufacturing equipment 124 of FIG. 1). In some embodiments, the processing logic further receives manufacturing process attributes (e.g., manufacturing process attributes 144 of FIG. 1, tool attributes, project attributes, customer attributes, program attributes, etc.) associated with the image (e.g., attributes of the manufacturing process executed by the manufacturing equipment 124 prior to or while the imaging equipment 126 captured the image 148). The manufacturing process attributes may be used for fine tuning the application classification and algorithm identification. In some embodiments, the images and manufacturing process attributes are stored in a data store (e.g., images and manufacturing process attributes uploaded to a job request image database as the images are captured by the imaging equipment 126.

In some embodiments, information regarding the image of interest (e.g., manufacturing process attributes 144 of FIG. 1, job attributes, etc.) and the image (e.g., image 148 of FIG. 1) are stored in a database (e.g., data store 140 of FIG. 1) responsive to the imaging equipment 126 (e.g., operated by a SEM technician or process engineer) capturing the image and the image being uploaded to the server (e.g., uploaded to image measurement system 110 per user request). The processing logic may send the image to a pre-trained machine learning model (e.g., CNN) for classification.

Training of the model may be performed using multiple images from the same application (e.g., from the same manufacturing process, from the same manufacturing equipment 124 of FIG. 1, etc.). In the case of insufficient training data (e.g., insufficient original images from the application), synthetic images may be created with acceptable variation in features expected by changing in process condition. A CNN may be a special neural network which can work directly with images. The CNN may be optimized with hyperparameters (e.g., hyperparameters that provide the greatest accuracy) during the training session. Training of the machine learning model may be done a priori from scratch using multiple images from the same application or using transfer learning approach from pre-trained machine learning models.

In some embodiments, processing logic (e.g., of image measurement system 110, of server machine 180, of training engine 182 of FIG. 1) receives a training dataset (e.g., generated via method 600 of FIG. 6) including historical images 142 that include first images and second images. Each image of the first plurality of images may be associated with the image classification and may include a first target output of the image classification. Each image of the second plurality of images may not be associated with the image classification and comprises a second target output of a different image classification. The processing logic may train the machine learning model (e.g., CNN) to classify images with the image classification or the different image classification using the training dataset to generate the trained machine learning model (e.g., trained CNN). In some embodiments, the processing logic trains the machine learning model (e.g., CNN) using a transfer learning approach from one or more pre-trained networks to generate the trained machine learning model (e.g., trained CNN).

In some embodiments, processing logic (e.g., of image measurement system 110, of server machine 170, of data set generator 172 of FIG. 1) determines that the first images in the training dataset is insufficient to train the machine learning model. The processing logic may create synthetic images (e.g., synthetic images 142B of FIG. 1) with variations in features expected by changes in the manufacturing parameters (e.g., see FIGS. 7-8). The processing logic may add the synthetic images to the first images in the training dataset. The synthetic images may be used to train the machine learning model.

At block 504, the processing logic determines, using a trained machine learning model (e.g., model 190 of FIG. 1), an image classification (e.g., image classification 146 of FIG. 1) for the image (e.g., the image is classified by the CNN for feature identification). The image classification may identify a type of structure in the image (e.g., regardless of the type of image modality, regardless of product edges that are darker or lighter in the image, etc.). The image classification may be determined in order to select the corresponding image processing algorithm and process information for the image.

In some embodiments, the processing logic extracts from the output of the trained machine learning model a confidence level of the image corresponding to one or more image classifications. For example, the processing logic may extract from the output a 60% confidence of class A and a 40% confidence of class B. Each image classification may correspond to a particular imaged product, image processing algorithm, image enhancement algorithm, and/or image measurement algorithm to use in enhancing and measuring the product represented in the image in some embodiments. In some embodiments, the processing logic determines an image classification responsive to a confidence level above 50% that the image corresponds to that image classification. Alternatively, a determination that an image corresponds to a particular image classification is responsive to the confidence level being above a confidence threshold of 60%, 70%, 80% or 90%, for example. In some embodiments, the processing logic determines the trained machine learning model failed to identify an image classification for an image responsive to none of the confidence levels being above 50% (e.g., 30% confidence class A, 30% confidence class B, 40% confidence class C).

In some embodiments, to use the trained machine learning model, the processing logic inputs the image and the manufacturing process attributes (e.g., certain attributes from the job request database, such as project, customer, program, tool names, etc.) into the trained machine learning model. The trained machine learning model may output the image classification based on the image and the manufacturing process attributes.

At block 506, the processing logic selects, based on the image classification, one or more image processing algorithms (e.g., one or more image processing algorithms 149 of FIG. 1, from a pool of image processing algorithms developed for specific applications, from an application/algorithm identification look-up table, one or more image enhancement algorithms and an image measurement algorithm, etc.) and process information (e.g., process information 150 of FIG. 1) for the image. In some embodiments, the one or more image processing algorithms include one or more image enhancement algorithms and an image measurement algorithm. In some embodiments, the image processing algorithm is a unique algorithm (e.g., unique image measurement algorithm) that is tailored to measure one or more attributes of the product displayed in the image that are produced as a result of the manufacturing process. There may be a unique algorithm for each image classification. Image measurement algorithms may include preset parameter values. Alternatively, some image measurement algorithms may include parameter values that are variable (e.g., based on process information associated with the image).

In some embodiments, the process information indicates one or more of a range of dimensions of the product in the image, materials of the product in the image, edges of the product in the image, shape of the structure, type of radiation that can penetrate the structure and generate an image of the structure, what is expected in the image, expected material contrast, etc. In some embodiments, one or more of the image processing algorithms or process information indicate how the measurements are to be performed or how the image is to be enhanced.

In some embodiments, an image processing algorithm may be used for both pre-processing the image (e.g., block 508) and measuring one or more attributes of the enhanced image (e.g., block 510). Alternatively, a first image processing algorithm (e.g., image enhancement algorithm) may be used to enhance the image and a second image processing algorithm (e.g., an image measurement algorithm) may be used to measure the image after it has been enhanced.

At block 508, the processing logic pre-processes the image based on at least one of the one or more image processing algorithms or the process information to generate an enhanced image (e.g., enhanced image 152 of FIG. 1). In some embodiments, pre-processing the image includes modifying the image in a manner that enhances edge and feature detection of the image (e.g., by using one or more image processing algorithms 149 and by using advanced image analysis, such as the process information 150) to generate the enhanced image.

In some embodiments, to pre-process the image, the processing logic may one or more of remove noise from the image, change a color gradient in the image, enhance image contrast of the image, perform a y-direction filter for measuring between vertical lines in the image, perform an x-direction filter to measure between horizontal lines in the image, smooth the lines in the image, connect edges in the image, etc.

In some embodiments, at least one of the one or more image processing algorithms or the process information may indicate the structure or material of images in the image classification and dimensions to be measured of the images in the image classification. To pre-process the image, the processing logic may identify structures or materials in the image and enhance the edges or differences between the structures or materials.

In some embodiments, to pre-process the image, the processing logic may use one or more pre-processing techniques (e.g., based on the one or more image processing algorithms or the process information). The pre-processing techniques may include unidirectional filtering. Responsive to determining one or more of application, customer, or project to which the image belongs (e.g., based on the manufacturing process attributes or process information), the processing logic may determine information associated with the structure in the image (e.g., of a pillar). In some embodiments, based on the determined structure, the processing logic may apply unidirectional filtering to enhance y-direction edge for horizontal critical dimension extraction.

In some embodiments, based on the determined structure, the processing logic may apply unidirectional filtering to enhance x-direction edge for vertical critical dimension extraction.

In some embodiments, the determined structure may indicate a first material has substantially a first width (e.g., is about 15 nanometers (nm) wide). To detect the transition between the first material and a second material, the processing logic may utilize the process information and average the gray level (GL) in x-direction of material 1 of a first width (e.g., of width 15 nm) to enhance the GL transition between materials. For example, a first image in an image classification may have a lighter shade of gray and a second image in the image classification may have a darker shade of gray. To perform pre-processing, the processing logic may convert the second image to the lighter shade of gray (e.g., responsive to comparing the first and second images, based on the gray level of the first image, based on an image processing algorithm). In some embodiments, to perform pre-processing, the processing logic may convert one or more portions of the image (e.g., convert the edges, target portions of the images, etc.) to a darker gradient (e.g., perform targeted specific dark contrast) to have more contrast between portions of the product displayed in the image based on the process information (e.g., instead of a global stripping or globally increasing of contrast).

In some embodiments, to perform feature identification (e.g., GL invariant), the structure of a first image may be identified, a matching template may be stored in the database, and the processing logic may perform an image GL transformation (e.g., global transformation, targeted transformation, etc.) on the first image based on the matching template to generate an enhanced image.

In some embodiments, the processing logic may remove edges of residue from product edges in an image. By removing the edges of residue, the continuity of the product edges may be broken, resulting in two or more unconnected lines. The processing logic may follow a product edge and connect the two ends of two or more product edges or lines. This may provide continuity for determining correct measurements during image measurement. The processing logic may determine an edge based on process information. The processing logic may apply an image processing algorithm to determine a discontinuity of the edge (e.g., in length), move from a last pixel of the edge to the right until another pixel of the edge is found, and join the two pixels by a straight line. In some embodiments, the processing logic may create a box of a certain width at the last pixel of the edge and move the box to the right (or left, up or down) until discovering another pixel of the edge and may join the two pixels with a straight line.

At block 510, the processing logic measures, using a first image processing algorithm (e.g., the image processing algorithm used for pre-processing in block 508, an image measurement algorithm, etc.) associated with the image classification, one or more attributes (e.g., width, height, length, thickness, etc.) of the enhanced image to determine image measurements (e.g., image measurements 154 of FIG. 1). In some embodiments, the processing logic uses the first image processing algorithm (e.g., image measurement algorithm) to identify a first edge in the enhanced image and a second edge in the enhanced image and to determine a distance between the first edge and the second edge. The distance may correspond to the image measurement. In some embodiments, a measurement overlay may be generated, which may be added to the image. The measured images with measurement overlay may be sent for report creation.

In some embodiments, the one or more attributes (e.g., width, height, length, thickness, etc.) in the image (e.g., that are to be measured in block 510) are pre-defined by an image processing algorithm or the process information for the image. Based on the image classification (e.g., based on the image and the manufacturing process attributes), one of the best matched algorithms is chosen from the pool and sent together with the image to block 508.

In some embodiments, the first image processing algorithm (e.g., image measurement algorithm) or the process information indicates to measure from left to right, to measure from the top in a downward direction until a color changes, to measure at a diagonal, or to make other measurements. For example, based on one or more of the first image processing algorithm or the process information, the processing logic may determine a starting point (e.g., top) of a product, a direction of measurement (e.g., down), and a width (e.g., 15 nm wide) of an area to consider for the measurement. The processing logic may measure from the starting point along the entire width in the direction of measurement until the stopping point is found (e.g., an average of the pixels along the width indicate the stopping point, any one of the pixels along the width indicates the stopping point, etc.). By measuring along the entire width, the stopping point can be found despite noise, etc. (e.g., averaging for signal improvement). The stopping point may be determined by identifying a change in contrast in the image (e.g., indicating an edge).

At block 512, the processing logic reports the image measurements. The report may include the images and the corresponding image measurements. The manufacturing parameters (e.g., manufacturing parameters 156 of FIG. 1) of the manufacturing process (e.g., of manufacturing equipment 124 of FIG. 1) may be updated based on the image measurements. In some embodiments, a report is generated and sent (e.g., via email, etc.) to the user. The measured image (e.g., with overlay) and image measurements may be stored in a job request image database (e.g., data store 140).

In some embodiments, at block 514, the processing logic determines updates to the manufacturing parameters based on the image measurements. In some embodiments, a device (e.g., client device 120 of FIG. 1, etc.) other than the processing logic determines the updates to the manufacturing parameters based on the image measurements. In some embodiments, user input of updates to the manufacturing parameters based on the image measurements are received (e.g., by manufacturing equipment 124, by client device 120) responsive to reporting the image measurements.

In some embodiments, the processing logic may determine updates to manufacturing parameters based on one or more of the manufacturing process attributes, process information, and the image measurements. The manufacturing process attributes may indicate manufacturing parameters used when the image was captured. The process information may indicate target dimensions (e.g., critical dimensions, specification, etc.). The processing logic may determine that first image measurements of a first image corresponding to first manufacturing parameters are closer to target dimensions than second image dimensions of a second image corresponding to second manufacturing parameters. Responsive to determining the first manufacturing parameters are associated with dimensions that are closer to target dimensions, the processing logic may determine current manufacturing parameters are to be updated to the first manufacturing parameters.

In some embodiments, at block 516, processing logic causes the updates to the manufacturing parameters to be displayed via a graphical user interface (e.g., via client device 120, etc.). For example, an alert may be transmitted to a client device of an administrator of the facility and displayed via the graphical user interface of the client device.

In some embodiments, at block 518, process logic causes the updates to the manufacturing parameters to be implemented (e.g., by the manufacturing equipment 124). In some embodiments, the processing logic causes the manufacturing equipment to shut down based on the image measurements or the updates to the manufacturing parameters (e.g., an update of a hardware change).

In some embodiments, the processing logic receives a second image of a second product associated with the manufacturing process. The processing logic may determine, using the trained machine learning model, the image classification for the second image and may select, based on the image classification, one or more image processing algorithms (e.g., one or more image enhancement algorithms and/or an the image measurement algorithm) and the process information for the second image. The processing logic may pre-process the second image using at least one of the one or more image processing algorithms and/or the process information to generate a second enhanced image. In some embodiments, the processing logic may determine a failure in the pre-processing of the second image. For example, an image enhancement algorithm may indicate that a targeted region of the product displayed in the image is to be enhanced. In response to not identifying the targeted region in the image, the processing logic may determine a failure.

In some embodiments (e.g., responsive to not failing the pre-processing), the processing logic may fail to measure, using the image processing algorithm, the one or more attributes of the second enhanced image. For example, the processing logic may determine, based on one or more of processing information or the image measurement algorithm), that a dimension is to be within a certain range (e.g., 70-90 nm) and the processing logic may fail to determine a measurement of the dimension for a second image within the range (e.g., determine a measurement outside of range, such as 200 nm; fail to identify the stopping point of the measurement, e.g., due to lack of contrast or due to noise; etc.). Upon failing to pre-process (e.g., enhance) an image or determine a measurement within the range in the image, the processing logic may automatically determine a failure (e.g., identify a failure to enhance the image, identify the incorrect or failed measurement, etc.). In some embodiments, the processing logic may automatically determine the image is an outlier (e.g., processing logic is unable to enhance or measure the image despite being able to enhance or measure other images that have the same image classification).

In some embodiments, the processing logic disregards the image corresponding to the failure (e.g., failed pre-processing, failed measurement). In some embodiments, the processing logic alerts the user that the image failed pre-processing or measurement. In some embodiments, the processing logic may receive user input to correct the incorrectly enhanced or measured image (e.g., changing contrast of the second image, removing noise from the second image). In some embodiments, the processing logic may cause the second image to be manually enhanced and/or measured to determine a second enhanced image and/or second image measurements of the one or more attributes and may report the second image measurements. In some embodiments, the processing logic receives user input to skip the images where pre-processing or measurement have failed.

FIG. 6 is a flow diagram illustrating an example method of generating data sets for determining image classification (e.g., image classification 146 of FIG. 1), according to certain embodiments. Image measurement system 110 may use method 600 to at least one of train, validate, or test a machine learning model, in accordance with embodiments of the disclosure. In some embodiments, one or more operations of method 600 may be performed by data set generator 172 of server machine 170 as described with respect to FIGS. 1 and 2. It may be noted that components described with respect to FIGS. 1 and 2 may be used to illustrate aspects of FIG. 6.

Referring to FIG. 6, in some embodiments, at block 602 the processing logic implementing method 600 initializes a training set T to an empty set.

At block 604, processing logic generates first data input (e.g., first training input, first validating input) that includes historical images (e.g., historical images 142 of FIG. 1) and manufacturing process attributes (e.g., manufacturing process attributes 144 of FIG. 1). In some embodiments, the first data input may include a first set of features for manufacturing process attributes and a second data input may include a second set of features for the manufacturing process attributes (e.g., as described with respect to FIGS. 2-3).

At block 606, processing logic generates a first target output for one or more of the data inputs (e.g., first data input). The first target output provides an indication of image classification (e.g., image classification 146 of FIG. 1).

At block 608, processing logic optionally generates mapping data that is indicative of an input/output mapping. The input/output mapping (or mapping data) may refer to the data input (e.g., one or more of the data inputs described herein), the target output for the data input (e.g., where the target output identifies image classification), and an association between the data input(s) and the target output.

At block 610, processing logic adds the mapping data generated at block 610 to data set T.

At block 612, processing logic branches based on whether data set T is sufficient for at least one of training, validating, or testing machine learning model 190. If so, execution proceeds to block 614, otherwise, execution continues back at block 604. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 614, processing logic provides data set T to train, validate, or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In some embodiments, input values of a given input/output mapping (e.g., numerical values associated with data inputs 210) are input to the neural network, and output values (e.g., numerical values associated with target outputs 220) of the input/output mapping are stored in the output nodes. The connection weights of the machine learning model are then adjusted in accordance with a learning algorithm (e.g., back propagation, etc.), and the procedure is repeated for the other input/output mappings in data set T. After block 614, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by image measurement component 132 (of image measurement server 130) to determine image classifications of images.

To train, validate, or test the machine learning model, each image may be labeled with the corresponding image classification. In some embodiments, subsequent to the training of the machine learning model, the image processing algorithm and the process information are received (e.g., generated) for each image classification. The image processing algorithm and the process information may be based on manual measurements of the images used for training, validating, or testing the machine learning model.

In some embodiments, upon receiving one or more additional images from one or more image classifications, the processing logic may retrain (e.g., and revalidate and retest) the trained machine learning model (e.g., based on the additional images and the images previously used to train the machine learning model. By retraining the trained machine learning model, the hyperparameters (e.g., layers in neural network, etc.) may be updated to use the hyperparameters that provide the greatest accuracy (e.g., responsive to accuracy dropping from 90% initial accuracy to 80% current accuracy using a first hyperparameter, a second hyperparameter that provides 85% current accuracy may be used).

Figure 7:
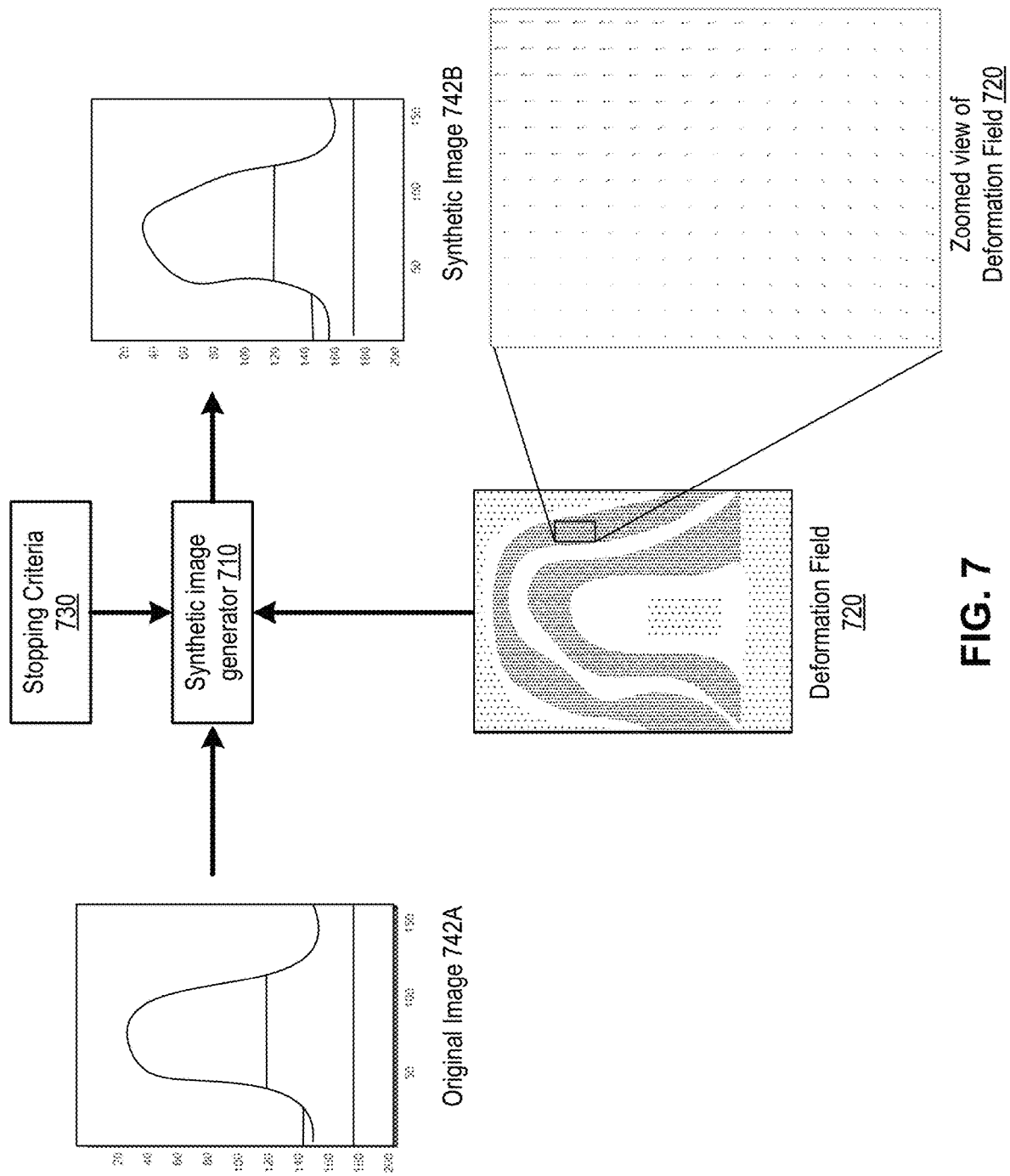
FIG. 7 is a block diagram illustrating a system for generating synthetic images, according to certain embodiments.

FIG. 7 is a block diagram illustrating a system 700 (e.g., image measurement system 110, server machine 170, data set generator 172 of FIG. 1) of generating synthetic images (e.g., synthetic images 142B of FIG. 1), according to certain embodiments.

In some embodiments, the system 700 may receive original images 742A (e.g., original images 142A of FIG. 1) and may determine that the original images 742A are insufficient to train a machine learning model. The system 700 may provide the original images 742A to a synthetic image generator 710 (e.g., server machine 170, data set generator 172 of FIG. 1) of the system 700.

The synthetic image generator 710 may be an iterative algorithm that changes the position (e.g., in direction and magnitude) of individual values at corresponding locations (e.g., pixels) in the original image 742A to updated corresponding locations (e.g., updated pixels) based on a randomly initialized deformation field 720. Each value corresponding to a pixel may move in eight directions (e.g., up, up-right, right, right-down, down, down-left, left, left-up) independently and still follow the global similarity criteria with the original image 742A. After each iteration, the deformation field 720 may be updated. The number of iterations and a sum of squared error (SSE) (e.g., global SSE) can be used as stopping criteria 730 for the algorithm. The sum of squared error (SSE) may be calculated by the following equation:

$$SSE = \Sigma_{i=1}^{k} \Sigma_{x \in C_i} d(x, m_i)^2$$

where k is the number of clusters, $C_i$ is the i-th cluster, x is a data point in cluster $C_i$ and $m_i$ is the representative point (e.g., centroid, mean vector of all data points in $C_i$) for cluster $C_i$. and $d(x, m_i)$ is a distance (Euclidian distance) between data point x and representative point $m_i$.

FIG. 7 illustrates a deformation field 720 and a zoomed view of a portion of the deformation field 720. The deformation field 720 may indicate a direction and magnitude of targeted deformation for one or more pixels of the image (e.g., targeted deformation may move location of one edge in a target direction or any direction without moving other portions of an image). The deformation field 720 may have an equal or weighted probability of different directions.

The deformation field 720 may have vectors associated with each pixel that indicate a difference between the images that are compared (e.g., difference between the initial synthetic image and original image). The length of each vector may represent a magnitude of displacement between the original image and the current iteration of the synthetic image. The deformation field 720 (e.g., displacement field) may be a vector field of all displacement vectors for all particles in a body (e.g., continuum body, product displayed in an original image), which relates the deformed configuration (e.g., synthetic image) with the undeformed configuration (e.g., original image). The analysis of deformation of the body may be in terms of the deformation field. In general, the deformation field may be expressed in terms of the material coordinates as:

$$u(X,t)=b(X,t)+x(X,t)-X, \text{ or } u_i=\alpha_{i,J}b_J+x_i-\alpha_{i,J}X_J$$

or in terms of the spatial coordinates as:

$$U(x,t)=b(x,t)+x-X(x,t), \text{ or } U_J=b_J+\alpha_{J,i}x_i-X_J,$$

where $\alpha_{J,i}$ are the direction cosines between the material and spatial coordinate systems with unit vectors $E_J$ and $e_i$, respectively. Thus, $$E_J \cdot e_i = \alpha_{J,i} = \alpha_{i,J}$$

and the relationship between $u_i$ and $U_J$ is then given by $$u_i = \alpha_{i,J} U_J \text{ or } U_J = \alpha u_{J,i} u_i$$

Knowing that $$e_i = \alpha_{i,J} E_J, \text{ then}$$

$$u(x,t) = u_i e_i = u_i(\alpha_{i,J} E_J) = U_J E_J = U(x,t)$$

The coordinate systems for the undeformed and deformed configurations may be superimposed, which results in b=0, and the direction cosines may become Kronecker deltas:

$$E_J \cdot e_i = \delta_{J,i} = \delta_{i,J}$$

Thus, we have:

$$u(X,t)=x(X,t)-X, \text{ or } u_i=x_i-\delta_{i,J}X_J=x_i-X_i$$

or in terms of the spatial coordinates as:

$$U(x,t)=x-X(x,t) \text{ or } U_J=\delta_{J,i}x_i-X_J=x_J-X_J$$

The deformation field 720 may be used to further adjust the synthetic image. Points on one or more edges of the synthetic image may be moved in a direction according to the deformation field 720, for example. A zoomed in portion of the deformation field 720 may indicate some values in the image corresponding to particular pixels are to move in a first direction, others in a second direction, etc. Values of pixels corresponding to the shape of the edges of the features that are to be deformed may have an associated magnitude of deformation based on the difference between the compared images (e.g., larger magnitude for larger difference, smaller magnitude based on smaller difference, no deformation based on no difference, etc.).

In some embodiments, the deformation field 720 is a probability of pixel value changing. The deformation field 720 may be weighted based on differences between images and process information (e.g., the manufacturing process may produce products with differences in certain dimensions).

The synthetic image generator 710 may generate one or more synthetic images 742B (e.g., synthetic images 142B of FIG. 1) for each original image 742A. The original images 742A and synthetic images 742B in combination may be sufficient to train the machine learning model.

To generate a synthetic image 742B, the synthetic image generator 710 may perform feature extraction to identify features of a first original image 742A that are expected to change based on manufacturing parameters of the manufacturing process. To generate the synthetic image 742B, the synthetic image generator 710 may further perform targeted deformation of one or more features of the first original image 742A.

In some embodiments, the synthetic image generator 710 may determine stopping criteria 730 for the targeted deformation based on a critical dimension of the product. The synthetic image generator 710 may perform the targeted deformation by iteratively moving one or more points on a feature until a threshold number of iterations have completed or the stopping criteria 730 is reached. The targeted deformation may be in a designated direction of movement.

In some embodiments, the first synthetic image 742B is further generated based on a targeted deformation field 720 that is randomly initialized. The synthetic image generator 710 may compare the synthetic image 742B to a original image of the original images to determine differences. The synthetic image generator 710 may update the deformation field 720 based on the differences to generate an updated deformation field 720. The synthetic image generator 710 may generate a second synthetic image by adjusting the first original image based on the updated deformation field 720. The deformation field 720 may include pixel value adjustments that have a weighted probability based on process information (e.g., process information 150 of FIG. 1).

In some embodiments, the first synthetic image 742B is generated by performing a combination of targeted deformation and global deformation of the first original image 742A. The global deformation may include one or more of flipping, shifting, rotating, zooming in, zooming out, etc. the first original image 742A. The global deformation may be performed before or after performing the targeted deformation.

Figure 8:
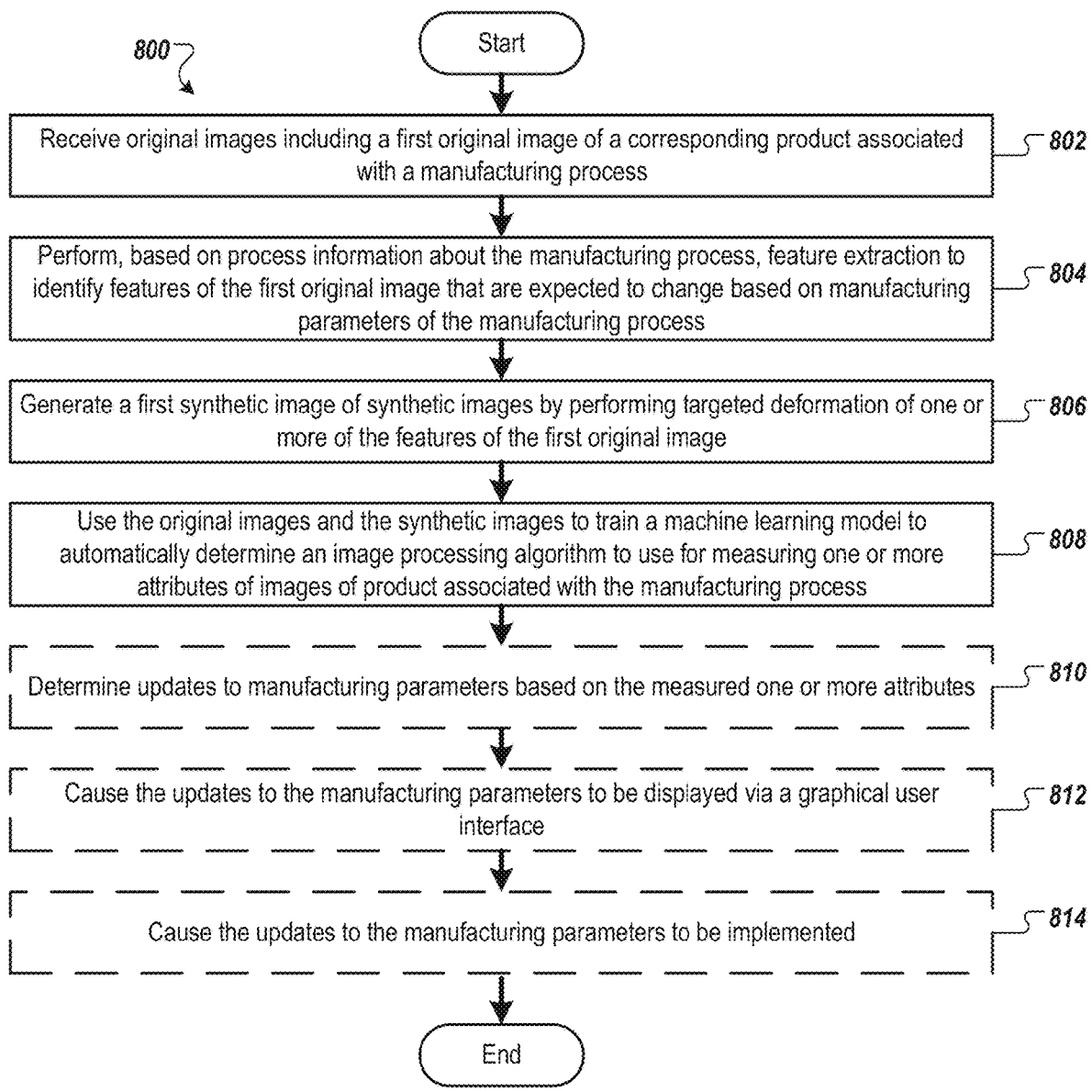
FIG. 8 is a flow diagram illustrating an example method of generating synthetic images, according to certain embodiments.

FIG. 8 is a flow diagram illustrating an example method 800 of generating synthetic images (e.g., synthetic images 142B of FIG. 1), according to certain embodiments. Method 800 may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In one embodiment, method 800 may be performed, in part, by image measurement system 110. In some embodiments, method 800 may be performed by image measurement server 130. In some embodiments, a non-transitory storage medium stores instructions that when executed by a processing device (e.g., of image measurement system 110) cause the processing device to perform method 800.

For simplicity of explanation, method 800 is depicted and described as a series of acts. However, acts in accordance with this disclosure can occur in various orders and/or concurrently and with other acts not presented and described herein. Furthermore, not all illustrated acts may be performed to implement the method 800 in accordance with the disclosed subject matter. In addition, those skilled in the art will understand and appreciate that the method 800 could alternatively be represented as a series of interrelated states via a state diagram or events.

Referring to FIG. 8, at block 802 the processing logic receives original images (e.g., original images 142A of FIG. 1) including a first original image. Each original image of the plurality of original images is of a corresponding product associated with a manufacturing process (e.g., performed by manufacturing equipment 124 of FIG. 1). In some embodiments, to train a machine learning model, a threshold amount of images from each image classification are to be used (e.g., 150 images from each image classification, 1000 images from each image classification, 10,000 images for each image classification, etc.). In some embodiments, the threshold amount of images is based on enough images to determine a delta or range of one or more dimensions to be measured using one or more of an image processing algorithm (e.g., an image measurement algorithm) or process information (e.g., a range of 50-60 nm is determined using at least 150 images). In some embodiments, the processing logic determines that the amount of original images (e.g., less than 150 images) is insufficient to train the machine learning model. The operations of blocks 804-808 may be performed responsive to determining that the amount of original images is insufficient to train the machine learning model.

At block 804, the processing logic performs, based on process information (e.g., processing information 150 of FIG. 0.1) about the manufacturing process, feature extraction on the first original image to identify features of the first original image that are expected to change based on changes to manufacturing parameters (e.g., manufacturing parameters 156) of the manufacturing process. The process information may indicate structure of the product in the images, range of dimensions, whether certain dimensions may shrink or increase from image to image (e.g., based process parameters), which dimensions are important, etc. The processing logic may determine edges of the product in the image that are to come closer together and are to move further apart based on the manufacturing parameters (e.g., are to have a dimension that is within a range).

At block 806, the processing logic generates a first synthetic image of synthetic images (e.g., synthetic images 142B of FIG. 1) by performing targeted deformation of one or more of the features of the first original image. The targeted deformation adjusts one or more of the features. The processing logic may move every point along an identified edge to generate one or more synthetic images (e.g., move every point along an identified edge one pixel to the left for a first synthetic image, move every point along the identified edge another pixel to the left for a second synthetic image, etc.).

In some embodiments, the processing logic generates one or more synthetic images (e.g., by moving edges of the original image) responsive to determining an image classification for the original image, determining one or more of an image processing algorithm (e.g., an image measurement algorithm) or process information based on the image classification, and determining the edges (e.g., that are associated with critical dimensions, that are to move based on the manufacturing parameters, etc.).

In some embodiments, the processing logic generates an initial synthetic image based on random deformation of the edges (e.g., based on a first original image and a random deformation field) and then generates subsequent synthetic images based on targeted deformation. The processing logic may determine locations corresponding to differences between the initial synthetic image and a second original image and perform targeted deformation at those locations (e.g., without deforming other portions of the image).

In some embodiments, the processing logic determines stopping criteria (e.g., stopping criteria 730 of FIG. 7) for the targeted deformation based on a critical dimension of the product. The processing logic may perform the targeted deformation by iteratively moving one or more points on a feature (e.g., moving one or more points one pixel to the left in the first iteration, moving the one or more points another pixel to the left in the second iteration, etc.) until a threshold number of iterations have completed or the stopping criteria is reached. The targeted deformation may be in a designated direction of movement. The stopping criteria may be used so that the synthetic images would be in the same image classification as the original images (e.g., the synthetic images would not be so distorted that they are no longer recognized as the same image classification as the original images). The processing logic may determine the stopping criteria based on the process information (e.g., process information indicates a range of 400-500 nm and the stopping criteria would allow iterations as long as the dimension is still between 400 and 500 nm (e.g., allow to shrink until 400 nm and allow to increase until 500 nm)).

In some embodiments, the first synthetic image is further generated based on a deformation field (e.g., deformation field 720 of FIG. 7) that may be randomly initialized. If the deformation field is randomly initialized, then the initial displacement of each point on the edges may be in a random direction. The processing logic may then compare the synthetic image to an original image of the original images to determine differences therebetween after the initial displacement. The processing logic may update the deformation field based on the differences to generate an updated deformation field. The processing logic may generate a second synthetic image by adjusting the first original image based on the updated deformation field. In some embodiments, the deformation field includes pixel value adjustments that have a weighted probability based on process information.

In some embodiments, the first synthetic image is further generated by performing a global deformation of the first original image. In some embodiments, the global deformation includes one or more of flipping, shifting, rotating, zooming in, zooming out, etc. the first original image. In some embodiments, a first set of synthetic images are generated by performing targeted deformations to original images. In some embodiments, a second set of synthetic images are generated by performing global deformations to original images. In some embodiments, a third set of synthetic images are generated by performing both targeted and global deformations to the original images.

At block 808, the processing logic uses the original images and the synthetic images to train a machine learning model (e.g., model 190 of FIG. 1) to automatically determine one or more image processing algorithms (e.g., one or more image processing algorithms 149 of FIG. 1) to use for measuring one or more attributes of images (e.g., images 148) of product associated with the manufacturing process. The original images and the synthetic images in combination may be sufficient to train the machine learning model.

In some embodiments, at block 810, the processing logic determines updates to the manufacturing parameters based on the measured one or more attributes (e.g., image measurements 154 of FIG. 1). Block 810 may be similar to block 514 of FIG. 5.

In some embodiments, at block 812, processing logic causes the updates to the manufacturing parameters to be displayed via a graphical user interface (e.g., via client device 120, etc.). For example, an alert may be transmitted to a client device of an administrator of the facility.

In some embodiments, at block 814, process logic causes the updates to the manufacturing parameters to be implemented (e.g., by the manufacturing equipment 124). In some embodiments, the processing logic causes the manufacturing equipment to shut down based on the image measurements or the updates to the manufacturing parameters (e.g., update of a hardware change, update of a process change, etc.).

Figure 9:
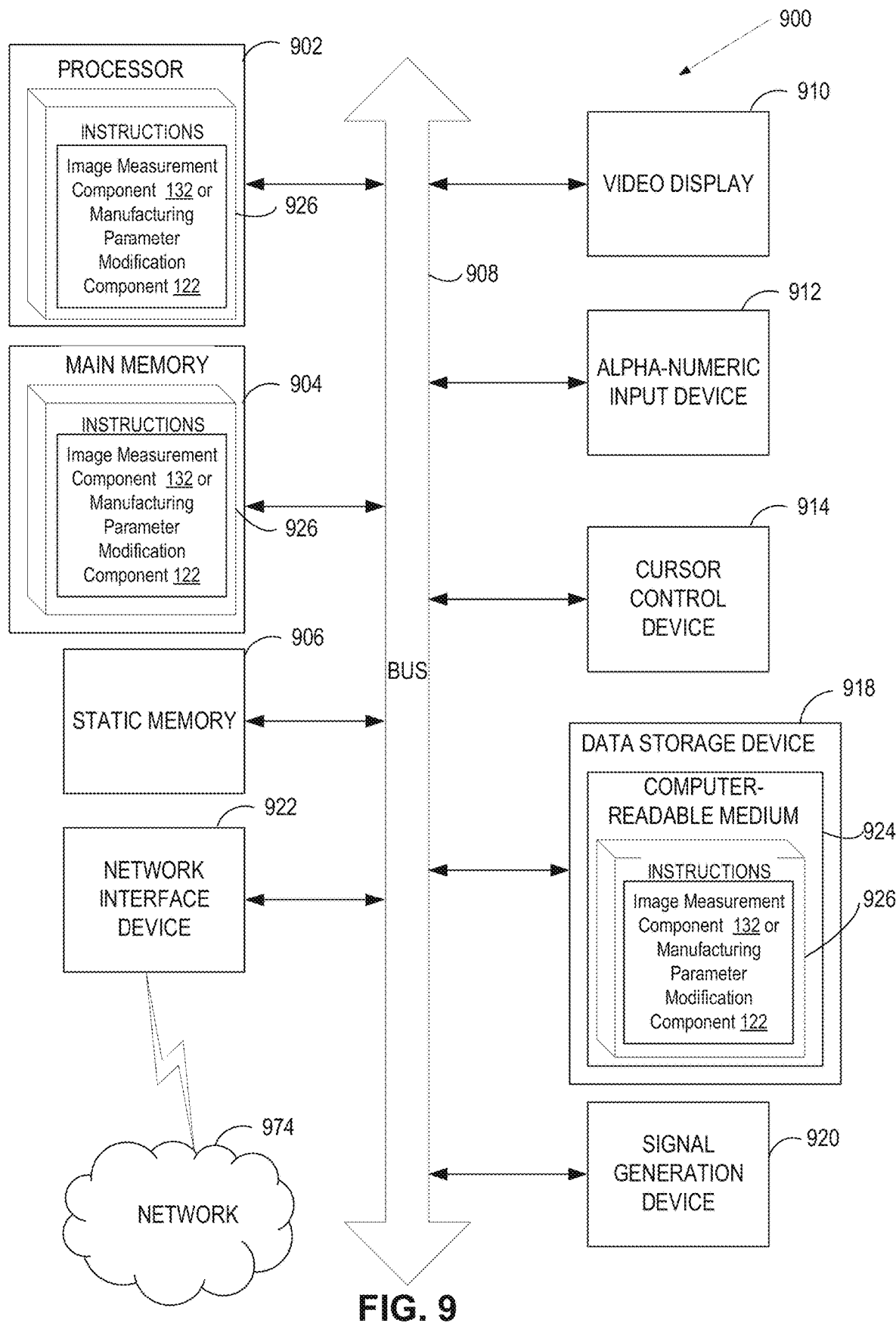
FIG. 9 is a block diagram illustrating a computer system, according to certain embodiments.

FIG. 9 is a block diagram illustrating a computer system 900, according to certain embodiments. In some embodiments, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alpha-numeric input device 912 (e.g., a keyboard), a cursor control device 914 (e.g., a mouse), and a signal generation device 920.

In some implementations, data storage device 916 may include a non-transitory computer-readable storage medium 924 on which may store instructions 926 encoding any one or more of the methods or functions described herein, including instructions encoding the image measurement component 132 (e.g., for determining an image measurement, for generating synthetic images, etc.) or manufacturing parameter modification component 122 of FIG. 1 and for implementing methods described herein.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "selecting," "pre-processing," "measuring," "reporting," "updating," "inputting," "training," "creating," "adding," "failing," "causing," "performing," "generating," "using," "comparing," "flipping," "shifting," "rotating," "zooming," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining a plurality of features of a first original image of a first wafer that are expected to be different for one or more wafers to be produced via wafer manufacturing parameters of a wafer manufacturing process compared to the first wafer;
   adjusting one or more of the plurality of features of the first original image to generate a first synthetic image; and
   providing a plurality of images comprising the first original image and the first synthetic image to train a machine learning model to generate a trained machine learning model configured to generate output associated with causing updates to the wafer manufacturing parameters of the wafer manufacturing process.

2. The method of claim 1 further comprising determining a stopping criteria for the adjusting of the one or more of the plurality of features based on a critical dimension of the first wafer, wherein the adjusting of the one or more of the plurality of features comprises iteratively moving one or more points on a feature of the plurality of features until a threshold number of iterations have completed or the stopping criteria is reached.

3. The method of claim 1, wherein the adjusting of the one or more of the plurality of features is in a designated direction of movement.

4. The method of claim 1, wherein the adjusting of the one or more of the plurality of features is to approximate the one or more wafers to be produced by the wafer manufacturing parameters of the wafer manufacturing process.

5. The method of claim 1, wherein the causing of the updates to the wafer manufacturing parameters comprises causing the updates to the wafer manufacturing parameters to be displayed via a graphical user interface.

6. The method of claim 1, wherein the causing of the updates to the wafer manufacturing parameters comprises causing the updates to the wafer manufacturing parameters to be implemented by manufacturing equipment.

7. The method of claim 1, wherein the causing of the updates to the wafer manufacturing parameters comprises causing operation of manufacturing equipment to be interrupted to implement the updates to the wafer manufacturing parameters.

8. The method of claim 1, wherein the wafer manufacturing parameters comprise one or more of a process parameter or a hardware parameter.

9. The method of claim 1, wherein the first synthetic image is further generated based on a deformation field that is randomly initialized, the method further comprising:
   comparing the first synthetic image to a second original image to determine differences;
   updating the deformation field based on the differences to generate an updated deformation field; and
   generating a second synthetic image by adjusting the first original image based on the updated deformation field.

10. The method of claim 9, wherein the deformation field comprises a plurality of pixel value adjustments that have a weighted probability based on process information associated with the wafer manufacturing process.

11. The method of claim 10, wherein the first synthetic image is further generated by performing a global deformation of the first original image.

12. The method of claim 11, wherein the global deformation comprises one or more of flipping, shifting, rotating, or zooming the first original image.

13. The method of claim 10, further comprising:
    determining that a plurality of original images comprising the first original image are insufficient to train the machine learning model; and
    generating a plurality of synthetic images comprising the first synthetic image responsive to determining that the plurality of original images are insufficient to train the machine learning model, wherein the plurality of original images and the plurality of synthetic images in combination are sufficient to train the machine learning model.

14. A system comprising:
    a memory; and
    a processing device, coupled to the memory, to:
      determine a plurality of features of a first original image of a first wafer that are expected to be different for one or more wafers to be produced via wafer manufacturing parameters of a wafer manufacturing process compared to the first wafer;
      adjust one or more of the plurality of features of the first original image to generate a first synthetic image; and
      provide a plurality of images comprising the first original image and the first synthetic image to train a machine learning model to generate a trained machine learning model configured to generate output associated with updating the wafer manufacturing parameters of the wafer manufacturing process.

15. The system of claim 14, wherein the processing device is further to determine a stopping criteria for adjusting the one or more of the plurality of features based on a critical dimension of the first wafer, wherein to adjust the one or more of the plurality of features, the processing device is to iteratively move one or more points on a feature of the plurality of features until a threshold number of iterations have completed or the stopping criteria is reached.

16. The system of claim 14, wherein the processing device is to adjust the one or more of the plurality of features in a designated direction of movement.

17. The system of claim 14, wherein the processing device is to adjust the one or more of the plurality of features to approximate the one or more wafers to be produced by the wafer manufacturing parameters of the wafer manufacturing process.

18. A non-transitory computer readable medium having instructions stored thereon, which, when executed by a processing device, cause the processing device to perform operations comprising:
    determining a plurality of features of a first original image of a first wafer that are expected to be different for one or more wafers to be produced via wafer manufacturing parameters of a wafer manufacturing process compared to the first wafer;
    adjusting one or more of the plurality of features of the first original image to generate a first synthetic image; and
    providing a plurality of images comprising the first original image and the first synthetic image to train a machine learning model to generate a trained machine learning model configured to generate output associated with updating the wafer manufacturing parameters of the wafer manufacturing process.

19. The non-transitory computer readable medium of claim 18, wherein the operations further comprise determining a stopping criteria for the adjusting of the one or more of the plurality of features based on a critical dimension of the first wafer, wherein the adjusting of the one or more of the plurality of features comprises iteratively moving one or more points on a feature of the plurality of features until a threshold number of iterations have completed or the stopping criteria is reached.

20. The non-transitory computer readable medium of claim 18, wherein the adjusting of the one or more of the plurality of features is in a designated direction of movement, and wherein the adjusting of the one or more of the plurality of features is to approximate the one or more wafers to be produced by the wafer manufacturing parameters of the wafer manufacturing process.

\* \* \* \* \*